US006951255B2

(12) United States Patent
Shepherd

(10) Patent No.: US 6,951,255 B2
(45) Date of Patent: Oct. 4, 2005

(54) WEED EXTRACTION TOOL

(76) Inventor: John D. Shepherd, 15765 Annico Dr., Lockport, IL (US) 60442

( * ) Notice: Subject to any disclaimer, the term of this patent is extended or adjusted under 35 U.S.C. 154(b) by 34 days.

(21) Appl. No.: 10/810,528

(22) Filed: Mar. 29, 2004

(65) Prior Publication Data

US 2005/0126799 A1    Jun. 16, 2005

Related U.S. Application Data

(60) Provisional application No. 60/520,830, filed on Nov. 17, 2003.

(51) Int. Cl.$^7$ ............................. A01B 1/00; A01B 33/06
(52) U.S. Cl. ..................................... 172/378; 294/50.9
(58) Field of Search ................................ 172/371–378; 294/50.8, 50.9, 50.5, 103.1, 104, 50.6

(56) References Cited

U.S. PATENT DOCUMENTS

| | | | |
|---|---|---|---|
| 1,549,198 A | 8/1925 | Haney | |
| 1,857,500 A | 5/1932 | Davison | |
| 1,931,773 A | 10/1933 | Sobol | |
| 2,029,155 A * | 1/1936 | Cervenka et al. | .......... 294/50.9 |
| 2,250,313 A | 7/1941 | Petz et al. | |
| 2,373,872 A * | 4/1945 | Couture | ..................... 294/50.9 |
| 2,402,550 A | 6/1946 | Hiack | |
| 2,437,393 A | 3/1948 | Kramer | |
| 2,593,283 A | 4/1952 | Erlebach, Sr. | |
| 2,680,643 A | 6/1954 | Cravotta | |
| 2,790,670 A * | 4/1957 | Sheets | ....................... 294/50.9 |
| 2,855,668 A | 10/1958 | Ottenad et al. | |
| 2,862,755 A | 12/1958 | Gulden | |
| 3,061,270 A | 10/1962 | Lowe | |
| 3,333,881 A | 8/1967 | Hollinger | |
| 3,663,050 A | 5/1972 | Fuchs | |
| 4,326,743 A | 4/1982 | Tamura | |
| 4,547,010 A * | 10/1985 | Camp | ....................... 294/50.9 |
| 4,603,744 A | 8/1986 | Ramirez | |
| 4,641,712 A | 2/1987 | Cravotta | |
| 4,723,802 A | 2/1988 | Fambrough | |
| 4,819,736 A | 4/1989 | Hedgepeth | |
| 4,905,768 A | 3/1990 | Lorenz | |
| 4,930,825 A * | 6/1990 | Dearman | ................... 294/50.9 |
| 5,004,283 A | 4/1991 | Sullivan | |
| 5,005,888 A | 4/1991 | Parks et al. | |
| 5,060,997 A | 10/1991 | Plecki | |
| 5,261,496 A | 11/1993 | Smotherman | |
| 5,330,010 A | 7/1994 | Smotherman | |
| 5,441,118 A | 8/1995 | Cruz, Jr. | |

* cited by examiner

*Primary Examiner*—Robert E Pezzuto
(74) *Attorney, Agent, or Firm*—Greer, Burns & Crain, Ltd.; Philip M. Kolehmainen

(57) ABSTRACT

A rotatable shaft has a claw structure near its lower end. The claw structure includes a first blade that is fixed relative to the shaft and a second blade that is movable relative to the first blade. The first, fixed blade is provided by the pointed lower end of the shaft. A blade defining member includes the second, movable blade. A central body portion of the blade defining member is pivotally mounted relative to the shaft so that the second blade can move toward and away from the first blade. The blade defining member includes a handle portion. A spring urges the movable blade toward the first blade to a claw closed position.

18 Claims, 3 Drawing Sheets

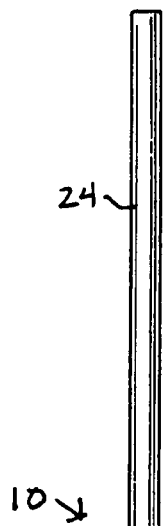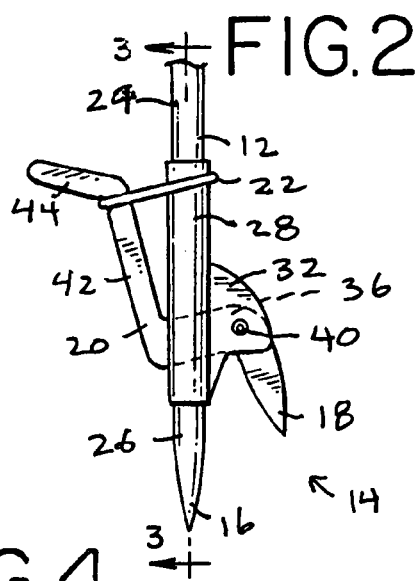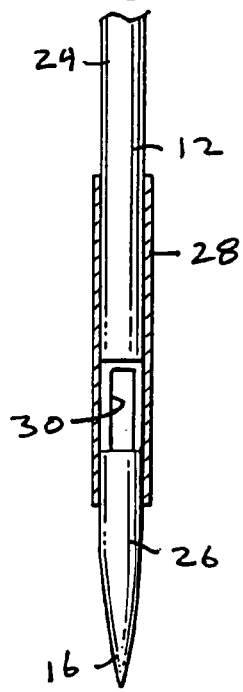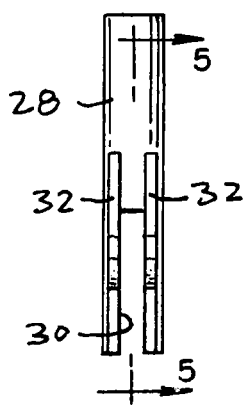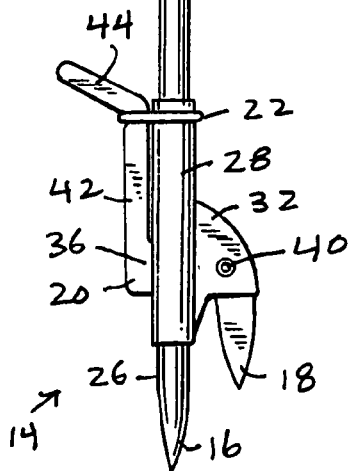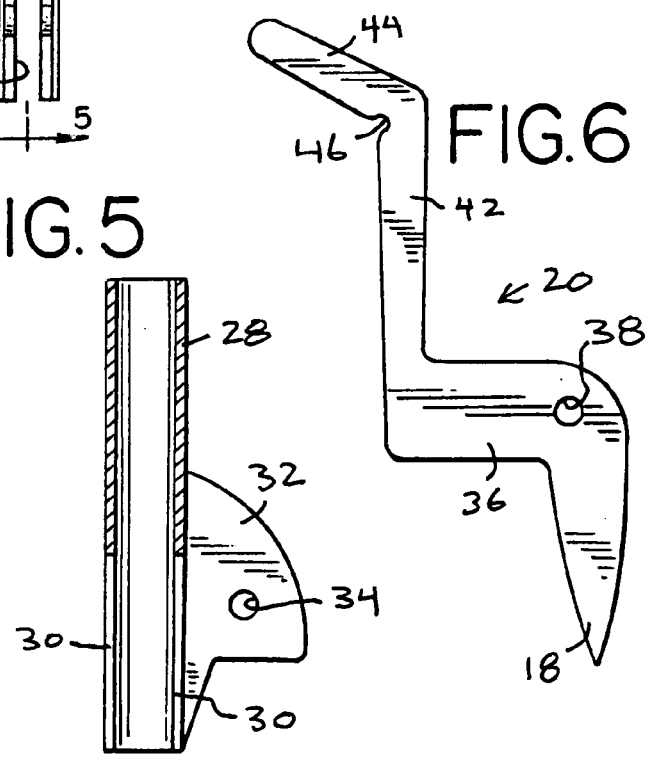

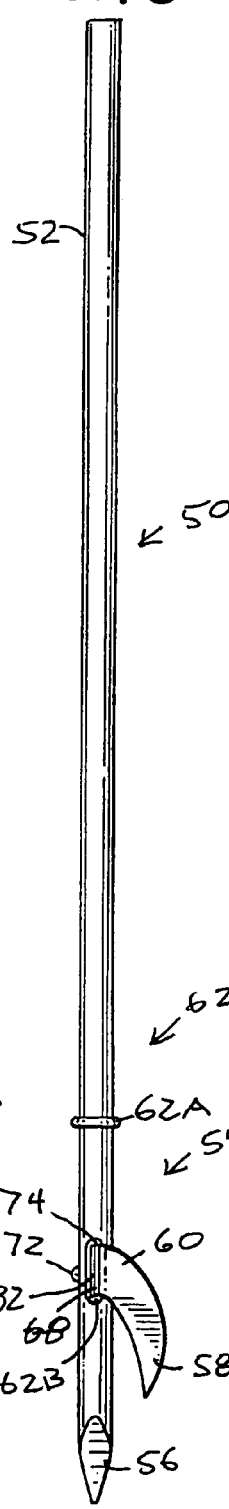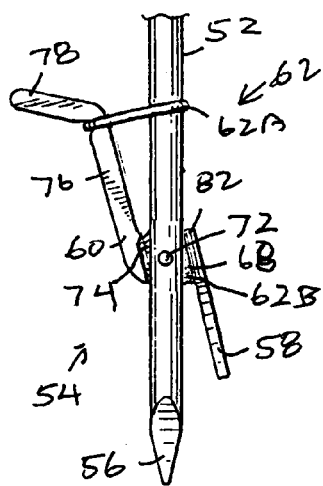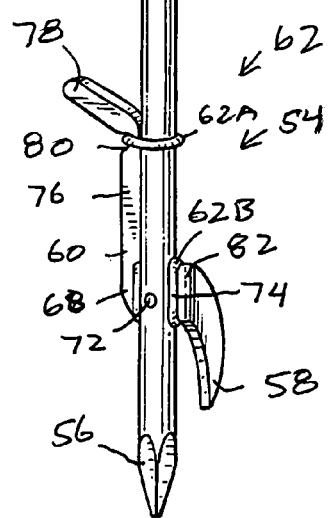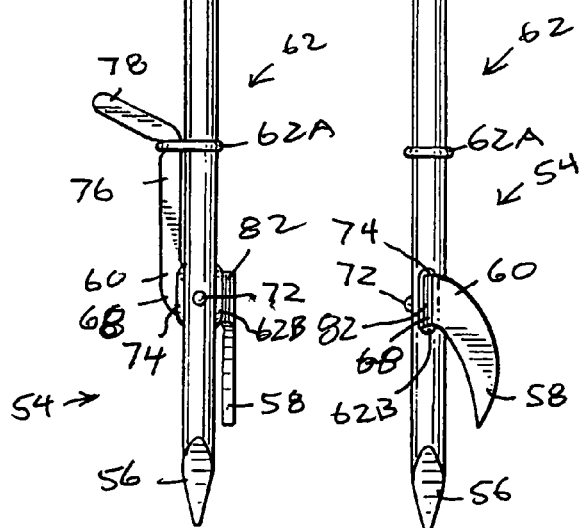

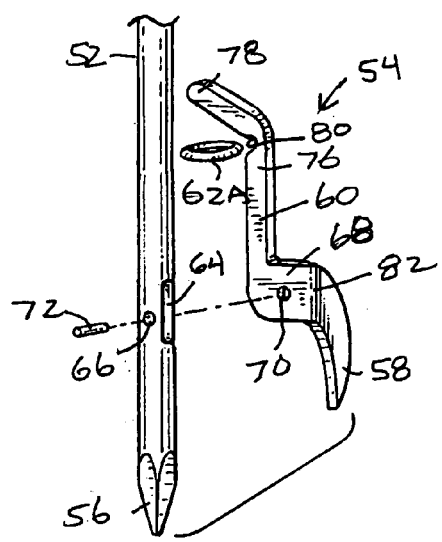

WEED EXTRACTION TOOL

This application claims benefit of Provisional application No. 60/520,830 filed Nov. 17, 2003.

FIELD OF THE INVENTION

The present invention relates to improved tools for extracting a weed together with its root system from soil.

DESCRIPTION OF THE PRIOR ART

Tools for weed extraction have been proposed in the past. An example can be found in U.S. Pat. No. 5,441,118. This tool includes a handle for rotating the tool and a pair of coil shaped, pointed tines for penetrating the soil when the tool is rotated.

U.S. Pat. No. 2,437,393 discloses a weed puller with a pair of spring rods having hook ends. When the end of the tool is driven into the soil, the hooks separate and straddle the weed. The tool is rotated to overlap the hooks and form a loop embracing the weed. The weed is extracted by pulling the tool from the soil.

Known weed extraction tools have been subject to disadvantages. Among the disadvantages are complexity, expense, lack of strength and durability, unsuitability to a wide variety of soil types and conditions, and inability to reliably and quickly extract weeds of diverse types and sizes.

SUMMARY OF THE INVENTION

A primary object of the present invention is to provide an improved weed extraction tool that is easy and inexpensive to make, that is sturdy and rugged, that operates reliably in a wide variety of soils and soil conditions, and that can extract weeds of various types and sizes.

In brief, in accordance with the present invention, there is provided a weed extraction tool including an elongated rotatable shaft having an upper end and a lower end. A claw structure is disposed at the lower end of the shaft. The claw structure includes a first blade and a second blade. The first blade is fixed relative to the shaft. The second blade is movable relative to the first blade. A spring resiliently biases the second blade toward the first blade.

BRIEF DESCRIPTION OF THE DRAWING

The present invention together with the above and other objects and advantages may best be understood from the following detailed description of the preferred embodiment of the invention illustrated in the drawings, wherein:

FIG. 1 is a side elevational view of a weed extraction tool constructed in accordance with the present invention;

FIG. 2 is a fragmentary view similar to part of FIG. 1 with the movable blade in an outer position;

FIG. 3 is a sectional view taken along the line 3—3 of FIG. 2 with the movable blade and O-ring omitted;

FIG. 4 is a front view of the shaft collar of the tool;

FIG. 5 is a sectional view of the shaft collar taken along the line 5—5 of FIG. 4, and;

FIG. 6 is a side elevational view of the blade defining member of the tool.

FIG. 7 is an isometric view of a weed extraction tool that is an alternative embodiment of the present invention;

FIG. 8 is a side elevational view of the weed extraction tool if FIG. 7;

FIG. 9 is a fragmentary view similar to part of FIG. 8 with the movable blade in an outer position;

FIG. 10 is a front elevational view of the weed extraction tool of FIG. 7;

FIG. 11 is a fragmentary, exploded isometric view of the claw structure of the weed extraction tool of FIG. 7;

FIG. 12 is a side elevational view of the weed extraction tool of FIG. 7, showing the side opposite to the side seen in FIG. 8;

FIG. 13 is a rear elevational view of the weed extraction tool of FIG. 7;

FIG. 14 is a top view of the weed extraction tool of FIG. 7; and

FIG. 15 is a bottom view of the weed extraction tool of FIG. 7.

DESCRIPTION OF THE PREFERRED EMBODIMENT

Having reference now to the drawing, FIGS. 1–6 illustrate a weed extraction tool 10 that is a first embodiment of the invention. The tool 10 includes an elongated central shaft 12 and a weed grasping claw structure 14 disposed at the bottom end of the shaft 12. The claw structure 14 includes a fixed point or blade 16 at the lower end of the shaft 12 and a movable blade or point portion 18 of a blade defining member 20 pivotally supported relative to the shaft 12. The blade 18 is biased by a spring 22 to a claw closed position seen in FIG. 1 where the movable blade 18 is relatively close to the fixed blade 16. The blade 18 can move away from the closed position to a claw open position such as seen in FIG. 2 where the movable blade 18 is spaced further from the fixed blade 16.

As seen in FIG. 3, the shaft 12 includes an upper segment 24 and an axially aligned lower, pointed segment 26 including the fixed point or blade 16. The shaft 12 includes a collar 28 that interconnects the upper and lower segments 24 and 26. The ends of the shaft segments 24 and 26 are received into and welded in place within the collar 28 to form a strong, rigid, continuous shaft 12. If desired, other construction techniques such as casting or forging could be used in place of welding.

A pair of diametrically opposed slots 30 are formed at the front and back of the collar 28 in order to receive the movable blade defining member 20. At the front of the shaft 12, the collar 28 is provided with a pair of flanges 32. The flanges 32 have aligned pivot openings 34 for pivotally supporting the blade defining member 20.

The blade defining member 20 has a central body portion 36 that is received in the slots 30 of the collar 28. Near the end of the body portion 36 adjacent the movable point portion 18, the blade defining member 20 includes a pivot opening 38. The opening 38 is located in alignment with the pivot openings 34 and a pivot pin 40, such as a rivet, is used to hold the blade defining member 20 and mount it for pivotal movement relative to the shaft 12 and the fixed point 16.

A lever portion 42 extends rearward and upward from the central body portion 36 and includes a handle 44 extending at an angle from the remainder of the lever portion 42. A spring retaining pocket 46 is defined at the base of the handle 44.

Spring 22 takes the form of a resilient rubber O-ring. The O-ring 22 is received in the pocket 46 and extends around the collar portion 28 of the shaft 12. The circumferential length of the O-ring is selected so that the blade defining member 20 is continuously biased toward the claw closed position of FIG. 1. The resilience of the O-ring 22 is such as to permit the movement of the blade defining member 20 to claw open positions such as that of FIG. 2 with the application of a predetermined force, for example in the neighbor hood of a few pounds.

As appears from the disclosure in FIGS. 1–6, the blade defining member 20 is a metal panel, and can, for example, be cut or stamped from panel metal stock. The blade defining member 20 lies in a single flat plane that coincides with the longitudinal axis of the shaft 12.

In operation, the tool 10 is used to extract a weed from soil in which it is growing. The fixed point 16 is pushed down onto the soil at or near the location of the center or stem of the weed. The tool is forced down until the fixed point 16 and the movable point 18 are both in the soil. The tool is rotated so that the claw structure 14 grasps the weed. A driving tool such as a common household electric drill or a manually operated brace can be used to rotate the shaft 12. The upper end of the shank segment 24 can have a polygonal shape for a non slip connection to the chuck of a drill. In a typical extraction operation, the tool is rotated about ninety to one hundred eighty degrees.

As the tool rotates, the weed, including its root system, is held in the claw structure 14 with a scissors like action. Depending on the size of the weed and its root system, the movable blade 20 can pivot against the force of the O-ring 22 so that even relatively large weeds can be held in the claw structure 14 and extracted. The movable blade 20 and O-ring 22 permit the claw structure 14 to resiliently accommodate a variety of weed types and sizes and to hold a weed firmly but with resilient compliance.

The tool 10, with a weed in its grasp, is lifted from the ground. The handle 44 can be used to further open the claw structure 14 for release of the extracted weed.

A weed extraction 50 that is another embodiment of the invention is illustrated in FIGS. 7–15. The tool 50 includes an elongated central shaft 52 and a weed grasping claw structure 54 disposed at the bottom end of the shaft 52. The claw structure 54 includes a fixed point or blade 56 at the lower end of the shaft 52 and a movable blade or point portion 58 of a blade defining member 60 pivotally supported relative to the shaft 52. The blade 58 is biased by a spring 62 to a claw closed position seen in FIGS. 7 and 8 where the movable blade 58 is relatively close to the fixed blade 56. The blade 58 can move away from the closed position to a claw open position such as seen in FIG. 9 where the movable blade 58 is spaced further from the fixed blade 56.

The lower end of the shaft 52 is pointed and provides the fixed point or blade 56. A slot 64 (FIG. 11) is formed through the shaft 52 in order to receive the movable blade defining member 60. Aligned pivot openings 66 intersect the slot 64 for pivotally supporting the blade defining member 60.

The blade defining member 60 has a central body portion 68 that is received in the slot 64 of the shaft 52. The body portion 68 includes a pivot opening 70 (FIG. 11). The opening 70 is located in alignment with the pivot openings 66 and a pivot pin 72, such as a rivet, is used to hold the blade defining member 60 and mount it for pivotal movement relative to the shaft 52 and the fixed point 56. The slot 64 around the blade defining portion 60 and pivot pin 72 is filled with a flexible, resilient, elastomeric rubber or rubber-like sealing material 74 to protect the internal parts from wear and corrosion.

A lever portion 76 extends rearward and upward from the central body portion 68 and includes a handle 78 extending at an angle from the remainder of the lever portion 76. A spring retaining pocket 80 is defined at the base of the handle 78.

Spring 62 includes a resilient rubber O-ring 62A. The O-ring 62A is received in the pocket 80 and extends around the shaft 52. The circumferential length of the O-ring 62A is selected so that the blade defining member 60 is continuously biased toward the claw closed position of FIGS. 7 and 8. The resilience of the O-ring 62B is such as to permit the movement of the blade defining member 70 to claw open positions such as that of FIG. 9 with the application of a predetermined force, for example in the neighbor hood of a few pounds.

The sealing material 74 provides another component 62B of the spring 62. The rubber or rubber-like material 74 is introduced and captured in the slot 64 and continuously urges the blade defining member 70 toward the claw closed position seen in FIGS. 7 and 8. The O-ring 62A and pocket 80 may be omitted if the sealing material 74 provides sufficient spring force.

The blade defining member 70 is a metal panel, and can, for example, be cut or stamped from panel metal stock. The blade defining member 70 includes a formed corner 82, for example a ninety degree bend. As a result of the bend 82, the movable blade 58 lies in a plane that is parallel to and spaced from the longitudinal axis of the shaft 12.

While the present invention has been described with reference to the details of the embodiments of the invention shown in the drawing, these details are not intended to limit the scope of the invention as claimed in the appended claims.

What is claimed is:

1. A rotary weed extraction tool comprising:
an elongated rotatable shaft having an upper end and a lower end;
a claw structure disposed at said lower end of said shaft;
said claw structure including a first blade and a second blade;
said first blade comprising said lower end of said shaft;
said lower end of said shaft having a single point;
said second blade being movable relative to said first blade; and
a spring resiliently biasing said second blade toward said first blade.

2. A weed extraction tool as claimed in claim 1, said second blade being pivotally mounted relative to said shaft.

3. A weed extraction tool as claimed in claim 1, further comprising a blade defining member including said second blade, said blade defining member including a lever portion and a central body portion between said second blade and said lever portion.

4. A weed extraction tool as claimed in claim 3, said central body portion being pivotally mounted relative to said shaft.

5. A weed extraction tool as claimed in claim 4, said spring being connected between said lever portion and said shaft.

6. A weed extraction tool as claimed in claim 5, said spring comprising a body of resilient rubber or rubber-like material.

7. A weed extraction tool as claimed in claim 6, said spring comprising an O-ring placed around said shaft and said lever portion.

8. A weed extraction tool as claimed in claim 3, said lever portion including a handle.

9. A weed extraction tool as claimed in claim 3 said blade defining member being a metal panel.

10. A weed extraction tool as claimed in claim 9, said shaft having a slot extending through said shaft, and said central body portion extending through said slot.

11. A weed extraction tool as claimed in claim 10, said central body portion being pivotally mounted in said slot.

12. A weed extraction tool as claimed in claim 11, said spring comprising rubber or rubber-like material in said slot.

13. A weed extraction tool as claimed in claim 11, said blade defining member being in a single plane coinciding with the axis of said shaft.

14. A weed extraction tool as claimed in claim 11, said blade defining member being formed with a corner between said central body portion and said second blade, said second blade lying in a plane parallel to and spaced from the axis of said shaft.

15. A rotary tool for extracting a weed from the ground, said tool comprising:
   an elongated rotatable shaft having a central longitudinal axis, an upper end and a lower end;
   said lower end of said shaft having a single point located on said axis for rotary entry into the ground;
   a claw structure including first and second opposed blades disposed at said lower end of said shaft;
   said lower end of said shaft and said point comprising said first blade;
   a member defining said second blade and being movable relative to said first blade;
   said blade defining member including said second blade at a first end of said blade defining member and including a handle lever at a second end of said blade defining member;
   said second blade being pointed;
   said blade defining member having a central portion between said handle lever and said second blade, said central portion being pivotally mounted to said shaft; and
   a spring resiliently biasing said second blade toward said first blade.

16. A tool as claimed in claim 15, said spring comprising a flexible, expandable band encircling said handle lever and said shaft and biasing said opposed blades toward one another.

17. A tool as claimed in claim 16, said band being an O-ring.

18. A method of extracting a weed from the ground comprising the steps of:
   capturing the weed in a tool;
   said capturing step including (i) inserting a pointed shaft into the ground near the weed, (ii) engaging the ground near the weed with a blade that is pivoted to the shaft, and (iii) rotating the shaft and the pivoted blade to grasp and capture the weed between the shaft and the blade;
   resiliently biasing the blade toward the shaft; and lifting the tool and the captured weed up from the ground.

* * * * *